United States Patent Office 3,255,204
Patented June 7, 1966

3,255,204
METHINE DYESTUFFS
Roderich Raue, Leverkusen, Werner Muller, Cologne, Oskar Weissel, Krefeld-Uerdingen, Germany, and Max Coenen, deceased, late of Gruiten, Germany, by Ruth Coenen, Gerda Coenen, Barbara Coenen, and Hella Coenen, heirs, all of Gruiten, Germany, assignors to Farbenfabriken Bayer Aktiengesellschaft, Leverkusen, Germany, a corporation of Germany
No Drawing. Filed Apr. 10, 1962, Ser. No. 187,148
Claims priority, application Germany, Aug. 22, 1958, F 26,470
3 Claims. (Cl. 260—319)

The present invention relates to novel methine dyestuffs. This invention is a continuation-in-part of our co-pending application 835,181, filed August 21, 1959, now abandoned.

It is an object of the present invention to provide novel methine dyestuffs which are distinguished by very good fastness properties, especially excellent fastness to light. Another object of this invention is to provide a process for the dyeing and printing with said novel methine dyestuffs of materials made from synthetic polyamides and polyurethanes as well as from polyesters, preferably polyethyleneterephthalates. A further object is the provision of dyed and printed materials of the above-mentioned class which possess very good fastness properties.

The new methine dyestuffs of this invention correspond to the formula

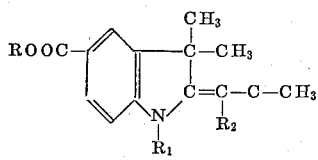

In this formula R stands for a lower alkyl group, preferably for —CH$_3$ or —C$_2$H$_5$, R$_1$ stands for hydrogen or lower alkyl, R$_2$ denotes hydrogen or —CN and R$_3$ stands for a radical of the cyano acetic acid, cyano acetic acid lower alkyl ester, cyano acetic acid substituted lower alkyl ester series, such as cyano acetic acid hydroxy lower alkyl ester and cyano acetic acid cyano lower alkyl ester, a cyano acetic acid amide, bound at the carbon atom in adjacent position to the —CN group, or R$_3$ stands for the radical of malonic acid dinitrile; the radicals R, R$_1$, R$_2$ and R$_3$ must not contain sulfonic acid groups.

The dyestuffs are obtainable, for instance, by condensing in preferably alkaline medium 2-methylene-5-carbo lower alkoxy indoline-ω-aldehydes which are disubstituted in 3-position by methyl groups and which may contain in 1-position lower alkyl substituents, with sulfonic acid group-free cyano acetic acid or its functional derivatives or nitriles, esters or amides indicated above. The reaction of the starting components is carried out in the presence or in the absence of dissolving or diluting agents, with the addition of preferably alkaline catalysts, e.g., by refluxing the reaction components for several hours. Suitable dissolving and diluting agents are those which, under the conditions of the condensation reaction, act indifferent and which are able to sufficiently dissolve the reaction components; there may be mentioned for instance, methanol, ethanol, dioxane, tetrachloromethane, chlorobenzene and toluene.

As alkaline condensation agents there can be used, e.g. pyridine, diethylamine, potassium hydroxide, sodium hydroxide and especially piperidine.

In order to obtain the dyestuffs in a finely divided form, the reaction of the starting components may be carried out in the presence of an emulsifying agent, such as a condensation product of oleyl alcohol with 20 mols of ethylene oxide.

Suitable aldehyde components of the indoline series are among others lower alkyl esters of 1,3,3-trimethyl-5-carboxylic acid-2-methyleneindoline-ω-aldehyde, such as the methyl and ethyl esters.

As components of the cyanoacetic acid series there may be used for instance, cyano acetic acid esters, such as the methyl, ethyl, propyl and butyl ester, cyano acetic acid-β-cyanoethyl ester, cyano acetic acid-β-hydroxyethylester, cyano acetic acid amide, -methylamide, -dimethylamide, -ethylamide, -β-hydroxy ethylamide, -diethylamide, -propylamide, -γ-methoxy propylamide, -γ-dimethylamino propylamide, -butylamide, -anilide, -benzylamide, and malonic acid dinitrile.

The novel methine dyestuffs yield valuable dyeings and prints on textile materials such as fibres, filaments, ribbons etc., made from synthetic polyamides and polyurethanes as well as from aromatic polyesters, preferably polyethyleneterephthalates.

The dyestuffs are applied onto the above-mentioned materials according to methods which are known as such, for instance, from an aqueous dispersion at temperatures of between about 60° C. to about 100° C. The dyestuffs can also be used for dyeing in the so-called spinning process by adding them to a spinning solution before spinning. The dyeings and prints which are obtained by the improved process of the present invention are distinguished by brilliancy and excellent fastness to light.

The following examples are given for the purpose of illustrating the invention without, however, limiting it thereto.

Example 25.9 parts by weight of 1,3,3-trimethyl-5-carbomethoxy-2-methyleneindoline-ω-aldehyde and 11.3 parts by weight of cyano acetic acid ethylester are heated to the boil at reflux condenser with 100 parts by volume of ethanol for 10 minutes, whereupon the aldehyde component partly dissolves. 2 parts by volume of piperidine are then added dropwise and the reaction mixture is further boiled. After 10 minutes a clear solution is obtained which is further refluxed for two hours. On cooling down, the dyestuff crystallizes in almost quantitative yield. It is filtered with suction and washed with ethanol (M.P. 174–175° C.).

20 parts by weight of the dyestuff thus obtained are kneaded with 80 parts by weight of a condensation product of formaldehyde and naphthalene sulfonic acid and with little water, until fine division. The paste is then dried at 50° C. in vacuo.

Yarn made from ε-caprolactam is introduced at 50° C. into a dye-bath which contains per litre 0.66 gram of the dyestuff dispersion described above, and 0.5 gram of a condensation product of formaldehyde and naphthalene sulfonic acid. The liquor-to-goods ratio is 35:1. The dye-bath is heated to 100° C. within 30 minutes and dyeing continued at this temperature for one hour. The yarn is subsequently rinsed with water and dried. One obtains a greenish-yellow shade having excellent fastness to light.

Fibres of polyethyleneterephthalate are dyed in a dye-bath having a liquor-to-goods ratio of 30:1, and containing 5 grams of cresotic acid methylester and 1.3 grams of dispersion of the dyestuff which was prepared in accordance with this example and converted into a finely divided state by the method indicated in Example 1; the pH value of the dye-bath was adjusted to 4.5 by the addition of sulfuric acid. Within 20 minutes the initial temperature of 50° C. is increased to 100° C. and dyeing continued at this temperature for one hour. The dyed material is then rinsed with water and dried. A greenish-yellow shade having very good fastness to light is thus obtained.

Similar results are obtainable if, instead of the starting components used in this example, the components listed in the following table are used for the preparation of the methine dyestuffs:

3. The dyestuff of the formula

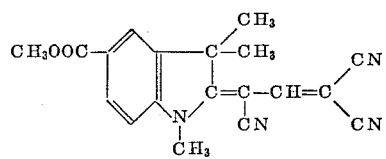

| Aldehyde component | Methylene compound | M.P. of the dyestuff, °C. | Shade of the dye on polyamide fibres |
|---|---|---|---|
| 1,3,3-trimethyl-5-carbomethoxy-2-methylene-indoline-ω-aldehyde. | Cyano acetic acid butylester | 165-167 | Greenish yellow. |
| 1,3,3-trimethyl-5-carbomethoxy-2-methylene-indoline-ω-aldehyde. | Cyano acetic acid-β-hydroxy ethylamide | 280-282 | Do. |
| 1,3,3-trimethyl-5-carbomethoxy-2-methylene-indoline-ω-aldehyde. | Cyano acetic acid-γ-methoxy-propylamide | 180-182 | Do. |
| 1-ethyl-3,3-dimethyl-5-carboethoxy-2-methyl-eneindoline-ω-aldehyde. | Cyano acetic acid ethylester | 160-163 | Do. |
| 1,3,3-trimethyl-5-carbomethoxy-2-methylene-+indoline-ω-aldehyde. | Malonic acid dinitrile | 152-155 | Do. |
| 1,3,3-trimethyl-5-carbomethoxy-2-methylene-indoline-ω-aldehyde. | Cyano acetic acid-β-cyano-ethylester | 215-218 | Do. |
| 1,3,3-trimethyl-5-carbomethoxy-2-methylene-indoline-ω-cyan-ω-aldehyde. | Malonic acid dinitrile | 227-229 | Do. |

We claim:
1. The dyestuff of the formula

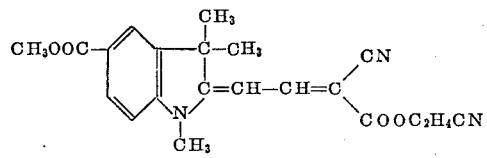

2. A dyestuff of the formula

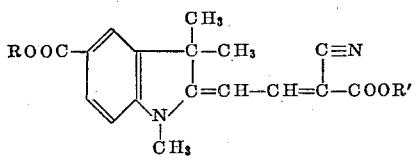

wherein R stands for lower alkyl and R' stands for cyano lower alkyl.

References Cited by the Examiner

UNITED STATES PATENTS 2,638,473   5/1953   Edwards _____ 260—319
2,697,707   12/1954   Kendall et al. _____ 260—240

FOREIGN PATENTS 409,350   4/1934   Great Britain.
551,825   11/1956   Belgium.

OTHER REFERENCES

Coenen Chemische Berichte, vol. 82, pages 66–72 (1949).

Coenen et al., Zeitschrift by Elektrocheme, vol. 57, pages 785–795 (1953).

Colour Index, vol. 3, 2nd Edition, 1956, pages 3401–3404, Charley & Pickersgill Ltd., Leeds, England.

NICHOLAS S. RIZZO, *Primary Examiner.*

IRVING MARCUS, WALTER A. MODANCE,
*Examiners.*

EGON E. BERG, MARY O'BRIEN, *Assistant Examiners.*